United States Patent
Uesugi et al.

[11] 3,994,572
[45] Nov. 30, 1976

[54] VARIFOCAL LENS SYSTEM WITH MACRO-PHOTOGRAPHY CAPABILITIES

[75] Inventors: Kyozo Uesugi, Izumi; Mitsuo Yasukuni, Osaka, both of Japan

[73] Assignee: Minolta Camera Kabushiki Kaisha, Osaka, Japan

[22] Filed: Apr. 3, 1975

[21] Appl. No.: 564,817

[30] Foreign Application Priority Data
Apr. 4, 1974   Japan.............................. 49-38654

[52] U.S. Cl................................. 350/186; 350/187
[51] Int. Cl.² ........................................ G02B 15/14
[58] Field of Search..................... 350/184, 186, 187

[56] References Cited
UNITED STATES PATENTS

| | | | |
|---|---|---|---|
| 3,227,042 | 1/1966 | Smejkal et al. ...................... | 350/184 |
| 3,466,113 | 9/1969 | Bertele.............................. | 350/184 |
| 3,694,056 | 9/1972 | Muszumanski ...................... | 350/184 |
| 3,884,555 | 5/1975 | Suwa et al. .......................... | 350/187 |

*Primary Examiner*—John K. Corbin
*Assistant Examiner*—Conrad Clark
*Attorney, Agent, or Firm*—Jackson & Jones Law Corporation

[57] ABSTRACT

A macro-photography varifocal lens assembly is provided for attachment to a camera body. The lens assembly can include a first lens group of negative refractive power and a second lens group of positive refractive power further supplemented by a master or auxiliary lens group of positive refractive power. One of the first and second lens groups are mounted for relative movement to vary the overall focal length of the lens assembly as the lens group moves across a predetermined range of movement. The image plane of the refracted image is continuously shifted from an initial predetermined position at one end of the range of movement towards the object and then away from the object to return to the initial predetermined position at the other end of the range of movement. This relative movement or shift of the image plane towards the object being sufficient to focus an image of an object in a macro-photography range. Various embodiments of the present invention can accomplish the combination of a lens system having two or more focal lengths with an intermediate macro-photography capability.

18 Claims, 12 Drawing Figures

FIG_1

FIG_2

FIG_3_

THE POSITION OF THE SECOND LENS GROUP REPRESENTED BY CORRESPONDING FOCAL LENGTH

FIG_4_

FIG_5_

FIG_6_

FIG_7_

FIG_8_

[S]
-0.2 0 0.2
SPHERICAL
ABERATIONS (SA)

[S]
-0.2 0 0.2
ASTIGMATISM (A)

[S]
-5 0 5
DISTORTION (D) %

FIG_9_

[M]
-0.2 0 0.2
(SA)

[M]
-0.2 0 0.2
(A)

[M]
-5 0 5
(D)

FIG_10_

[L]
-0.2 0 0.2
(SA)

[L]
-0.2 0 0.2
(A)

[L]
-5 0 5
(D)

FIG_11_

POSITION OF THE SECOND LENS
GROUP ACROSS THE FOCAL RANGE
MOVEMENT

VARIFOCAL LENS SYSTEM WITH MACRO-PHOTOGRAPHY CAPABILITIES

BACKGROUND OF THE INVENTION

1. Field of the Invention

The present invention relates generally to varifocal lens assemblies and more particularly to a varifocal lens assembly having a macro-photography capability.

2. Description of the Prior Art

As generally known by optical designers, a varifocal optical system provides a lens system in which the focal length or image magnification can be continuously varied, while a relatively sharp image is automatically maintained in a fixed plane within tolerable limits. It has been known that a continuously variable focal length is achieved by displacing the optical components of a system relative to each other. This effect however, is accompanied by a displacement of the image plane of the system. Thus, the optical designer of a varifocal system, has been continuously faced with the problem of compensation for image shifts, in addition to the problem of correction of aberrations for each position of the movable lens components.

In early designs, the image shift compensation was achieved by mechanical means. Generally, these mechanical designs required imparting two or more coordinated movements to the lens elements of the system. The first movement would effect the change in overall focal length while the second movement of the lens would compensate for the image shift. In addition, a third movement would be added for the purpose of changing the size of the aperture stop to keep the light output of the lens constant across the variable focal lengths. Examples of these equivalent varifocal lens systems, can be seen in the Warmisham et al, U.S. Pat. No. 1,947,669; Naumann U.S. Pat. No. 1,988,390 and Mellar el al, U.S. Pat. No. 2,159,394. These movements in the mechanical image shift compensation lens systems were nonlinearly correlated to each other, thus, necessitating comparatively complicated cam controls and precise tolerances.

An optical image shift compensation was first suggested at the turn of the century, for example, Allen U.S. Pat. No. 696,788. The theory behind an optical image shift compensation has been set forth in GENERAL THEORY OF OPTICALLY COMPENSATING VARIFOCAL SYSTEMS by Bergstein, Journal of the Optical Society of America, Volume 48, No. 3, P. 154, March 1958, wherein a general analytical theory of the Gaussian optics of optically compensated varifocal systems is fully developed. The contents of this article is hereby incorporated by reference for purposes of supplementing the disclosure of the present invention.

Generally, in an optically compensated varifocal system, alternately stationary and relatively fixed movable lens components can be arranged to produce an optical system which will have an overall focal length variable continuously between any two predetermined values upon a displacement of the movable components from their reference position. While the movable interconnected system is being displaced from one extreme position to the other to change the overall focal length the final image of the system will pass through the same position at least once. The deviation of the image plane from a predetermined reference plane, e.g., film plane, will be zero at least once and possibly more depending upon the number and arrangement of movable lens components.

The optical designer of a zoom lens will attempt to maximize those points of zero divergence while minimizing the deviations between the zero points. As is shown, the depth of focus especially of objects a considerable distance from the lens system provides the designer with a degree of tolerance in positioning the film plane. The relative distances of the objects lying in a plane conjugate to that of the photographic plate or film can vary within a certain range and still provide acceptable photographic objects. The range of object distances or depth of field will vary relative to the distance of the object from the lens system. Optical designers of zoom lens assemblies are fully cognizant of the tolerances permissible while still maintaining a commercially acceptable photograph.

Reference is made to the article, "TWO-COMPONENT OPTICALLY COMPENSATED VARIFOCAL SYSTEM" by Bergstein et al, Journal of the Optical Society of America, Volume 52, No. 4, P. 353, April 1962, wherein the design of a two-component optically compensated varifocal lens system is disclosed. Basically, the design parameters are based on a math model wherein the image plane deviations are measured relative to the movement of one element of the lens system. In optimizing the lens design, consideration is given to the particular use of the lens system so that the image deviations can be reduced to zero at the appropriate positions. In a two-lens component system the image plane will pass through the same predetermined position and space at only two positions. Thus, the image plane deviations can be reduced to zero at two separate points, that is, the image will be formed correctly in conjugate with the photographic plane in two positions. The defect of focus at intermediate points will generally follow the parabolic law. With a relatively simple two-component zoom system, the parameters of the system is generally chosen to minimize the image deviation within acceptable minimum tolerances throughout the entire desired focal range.

In the above article, entitled "TWO-COMPONENT OPTICALLY COMPENSATED VARIFOCAL SYSTEM", one such lens system which has a maximum over-all focal length when the movable components are in a front position is shown. This lens system comprises a first lens group of negative refractive power and a second lens group of positive refractive power movable along the optical axis relative to the first lens. The focal length of a system of this type, is continuously varied in the course of the movement of the second lens group from one extreme to another extreme of its movable mounting.

During the variance of the focal length of the system the image plane deviation follows a parabolic law wherein the image plane of the system is shifted from an initial position towards the object side of the design focal plane then is shifted back again to the same initial position at the other extreme of the focal length range. In the design of a normal two-component zoom lens, the absolute image plane deviation, would be designed to be maintained within permissible tolerances whereby the depth of field would be of such a size for the particular focal length that all objects within this range would be simultaneously "in focus" on the photographic film or plane. Reference is made to both of the above mentioned articles in the Journal of the Optical Society of America for the theory in designing a lens system taking into consideration the image plane deviation characteristics of varifocal lens systems.

Briefly, the reflective power, $f_1$, of a first lens group and the reflective power, $f_2$, of the second lens group are given as follows:

$$f_1 = - \frac{1}{\sqrt{R}} + S_{12} \qquad (1)$$

$$f_2 = + \frac{\sqrt{R}}{R-1} \qquad (2)$$

wherein R is the ratio of the maximum to minimum overall focal length of the combined first and second lens groups and $S_{12}$ is a distance between the first lens group, which for purposes of analysis is represented as a thin lens and a second lens group, which is also represented by a thin lens, when the first and second thin lens groups are in a position having the maximum focal length.

In accordance with the design objectives, of using a varifocal lens system as a zoom lens, the focal plane of the back focal length of the lens system is positioned relative to the depth of field to be midway between the displacements of the image plane across the range of the focal length of the zoom lens, thus, by picking the appropriate setting of the back focal length, the zoom lens assembly will be in focus with an object set at an infinite distance across the entire range of focal lengths, the image plane being that of the object set at infinity.

In accordance with the conventional characteristics of a zoom lens, the setting of the back focal length with appropriate consideration taken for the null points of image plane deviation permits the extreme positions of image plane deviation to be within the depth of focus or depth of field of the lens system. Accordingly, there is no loss of focus, with regards to acceptable photographic tolerances, throughout the variation of a focal length when the above mentioned extremes of image plane deviations are both within the depth of focus of the system. As understood by the lens designer, the degree of image plane deviation that is commercially acceptable depends upon the depth of field required, a large depth of field will provide a relatively large depth of focus, however, in the field of macro-photography or close-up photography, a relatively narrow depth of field will require a corresponding relatively narrow depth of focus.

It has been known to use zoom lens assemblies for macro-photography in various ways. For example, a separate close-up lens attachment or an extension tube attachment has been combined with a zoom lens assembly to provide macro-photography. This compounding of lens accessories on the basic camera body is both burdensome, expensive and unwieldy during normal use by a photographer. It has also been suggested that a zoom lens be designed, wherein the lens components are given a special movement during macro-photography. This special movement being different from the movement utilized during the zooming photography across the range of focal lengths. As mentioned earlier, with regard to mechanical compensation of image shift, the use of various lens arrangements wherein coordinate movement of the lenses are required, further adds to the complication of the basic lens system, increases the size of the construction of the lens system and requires additional cost. The ability to provide a variable focal length with a capability for macro-photography in a relatively simple and uncomplicated lens system has not been provided by the prior art.

SUMMARY OF THE INVENTION

An object of the present invention is to provide a simply constructed varifocal lens assembly capable of being utilized for macro-photography.

Another object of the present invention is to provide a varifocal lens assembly having at least two different focal lengths for photography and further having the capability of being utilized for macro-photography.

A further object of the present invention is to provide a relatively easily assembled varifocal lens assembly which is inexpensive and easy to manufacture on a production line basis.

A still further object of the present invention is to provide a compact and light weight varifocal lens assembly that eliminates the necessity of adding macro-photography lens accessories.

The present invention provides a macro-photography varifocal lens assembly that is specifically adapted for attachment to a camera body and the like. One embodiment of the varifocal lens assembly includes a first lens group and a second lens group supplemented by a third master lens group. Mounting means are provided for mounting the first and second lens groups wherein one of the lens groups is mounted relatively movable to the other lens group to provide a continuously increasing focal length for the lens assembly as the movable lens group is positioned across a predetermined range of movement. The image plane of an object being continuously shifted from an initial predetermined position at one end of the range of movement towards the object and then away from the object to return to its initial predetermined position at the other end of the range of movement. The relative movement of the image plane from its initial position towards the object being sufficient to permit the focusing of an object in the macro-photography range. The back focal length of the lens assembly in the present invention is set so that the image plane of an object at an infinite distance coincides with the design focal plane at either end of the range of movement of the movable lens group. The intermediate shifting of the image plane towards the object side is advantageous for macro-photography in that the image plane of an object at a relatively close distance, e.g., less than one meter, begins to coincide with the relatively small depth of focus of the focal plane.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

The following specification taken in conjunction with the drawings sets forth various examples of the present invention in such a manner that any person skilled in the art, can make and use the invention. The embodiments of the invention disclosed herein, are the best modes contemplated by the inventors in carrying out their invention in the commercial environment, although it should be understood that various modifications can be accomplished within the parameters of the invention.

Figure 1:
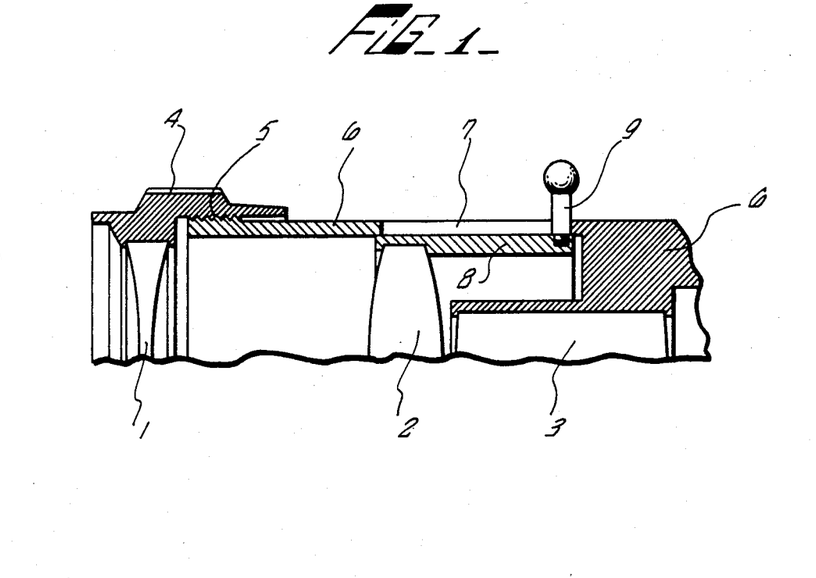
FIG. 1 is a cross sectional view of one half of a symmetrical lens system of the present invention.

Referring to FIG. 1, the first embodiment of the present invention is disclosed in a cross sectional view wherein it is understood that the embodiment of the invention is symmetrical about optical axis, OA. The varifocal lens system comprises a first lens group 1, a second lens group 2, and a third lens group 3. Each of the lens groups can, in actual practice, be a combination of lenses, represented herein as a hypothetical thin lens of the same focal length as the actual compound lens.

The third lens group 3 serves as an auxiliary lens or a master lens but is not considered part of the varifocal lens system proper and is not essential to an understanding of the present invention. The third lens group or master lens, is still a necessary part of the overall varifocal lens system and is used to obtain the desired absolute focal range, the desired type of final image (real or virtual, inverted or upright) and the position of this image in space. The master lens or auxiliary lens system, is also used to achieve a satisfactory state of correction of the image aberrations.

A focus ring 4, movably mounts the first lens group 1. Rotation of the focus ring 4, which is fitted over a stationary lens barrel 6, permits a relative movement of the first lens group 1. As disclosed in FIG. 1 the stationary lens barrel 6 is appropriately threaded or embedded with helicoidical grooves 5 which coact with corresponding threads or helicoidical grooves on the focus ring 4 to permit the relative movement. Since the varifocal lens system of the present invention is to be used as a photographic lens for different object distances, the relatively stationary first lens group 1, can be used for focusing without disturbing the final image of the varifocal system.

Figure 2:
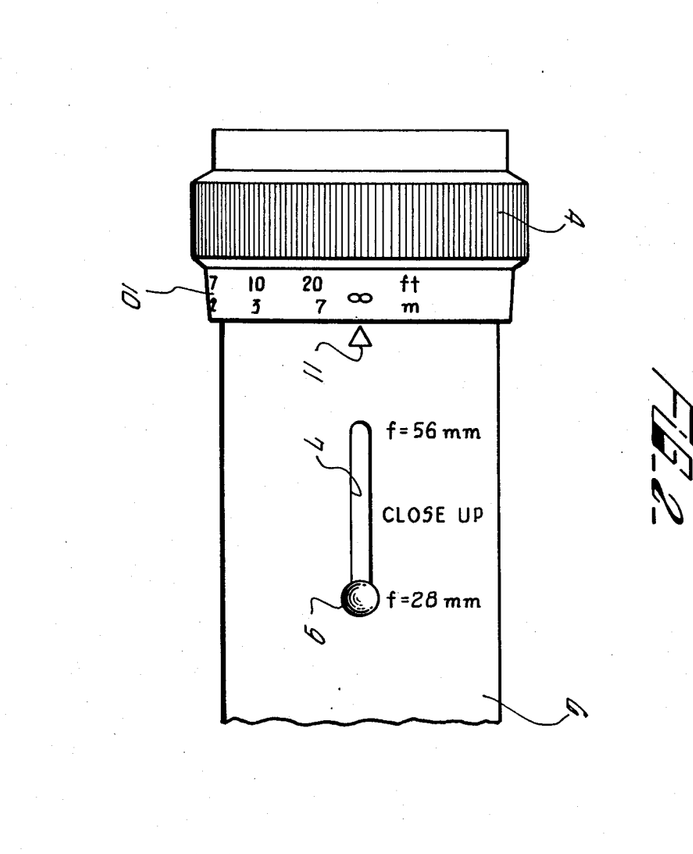
FIG. 2 is a plan view of the embodiment of FIG. 1.

A movable lens frame 8, which can take the form of a tubular member, mounts the second lens group 2 within the stationary lens barrel 6. A slot or groove 7 is provided in the stationary lens barrel 6, as can be seen in FIG. 2, parallel to the optical axis of the lens system. A handle 9 is securely mounted on the movable lens frame 8 and extends through the slot 7 for ease of manipulation by an operator through a predetermined range of movement. Referring specifically to FIG. 2, indicia or graduations in distance are marked on the focus ring 4 with appropriate calibration to indicate, in conjunction with the indicia or marker 11 on the stationary lens barrel 6, a distance from the lens to an object in focus.

Referring again to the embodiment of FIG. 1, if the focus ring 4 is adjusted so as to focus the varifocal lens assembly at an infinite point, then when the second lens group 2 is slidingly shifted by the handle 9 from the image to the object side, or from the right hand to the left hand extremity of FIG. 1, the focal length of the overall varifocal lens system will progressively increase from $f = 28$ mm. to $f = 56$ mm. with an extreme image plane deviation occurring between these two points. By way of comparison, a lens assembly in a conventional zoom lens is designed to maintain its focus on an infinite point, and minimize any image plane deviations, as the focal length varies across the entire focal range. This is graphically disclosed as the broken line A in FIG. 3. As mentioned above, the design of a conventional zoom lens sysem seeks to minimize any image plane deviations due to variation in the focal length across the entire focal range. In accordance with the design parameters of the present invention, a lens assembly, such as disclosed in FIG. 1, is designed in such a manner that with an increase in focal length the distance from the lens to an object in focus would be shifted to optimize the macro-photographic capabilities of the system and then finally return to an in focus condition for an object at infinity. This feature of the present invention, is graphically plotted as curve D in FIG. 3.

The design parameters of the present invention can be stated in terms of image plane deviations wherein an image plane of an object at infinity is positioned within the depth of focus of the photosensitive film as the movable second lens group 2, is located respectively at the extreme right hand or left hand position of the movement of handle 9. The image plane however, is greatly shifted towards the object throughout a portion of the intermediate sliding movement of the second lens group 2. This advantageous image plane deviation towards the object is effectuated by arranging the lens power of the individual lens group in such a manner that the first lens group 1 is of a negative refractive power and the second lens group is of a positive refractive power. With this particular sequential power arrangement, it is possible to utilize relatively compact and smaller lens diameters thereby contributing to an overall compact lens assembly.

The power arrangement of the lenses in the varifocal lens system and the range of movement of the second lens group 2 can be expressed in numerical values to illustrate the advantages of the present invention. The first lens group 1, which as mentioned earlier, can be regarded for design purposes as an equivalent thin lens, can have an equivalent focal length of $f_1 = -40.284$ mm. and the third lens group 3 can consist of a positive lens group having an equivalent focal length of $f_3 = 199.362$ mm. The first and third lens groups can have a maximum space position of 72.83 mm. with the back focal length being set to 3.40 mm. The positioning of the various lens groups within the stationary lens barrel 6 permits the overall lens assembly to be utilized for a camera wherein the design focal plane or photosensitive film is positioned at a point on the rear side of the lens assembly. This distance will correspond to the back focal length of the lens system.

If the second lens group 2, consists of an overall positive lens group having an equivalent thin film focal length $f_2 = 28.184$ mm. and it is positioned apart from the first lens group 1 at an inter-lens distance of 28.00 mm. then the distance $S_1$ from the lens assembly to an object in focus will be $S_1 = \infty$. The overall focal length $f$ of the lens assembly of the present invention, at that time, would be $f = 28.00$ mm. When the second lens group is shifted across the entire range of movement towards the first lens group 1, such that the inter-lens distance therebetween is 8.00 mm., then $S_1 = \infty$ and $f = 56.00$ mm.

Thus, at these two focal lengths, i.e., $f = 28.00$ mm and $f = 56.00$ mm., photography can be effectuated at an object in normal distance, i.e., at an object at infinity or at a point relatively a short distance away or at any point therebetween by adjustment of the focus ring 4.

Figure 3:
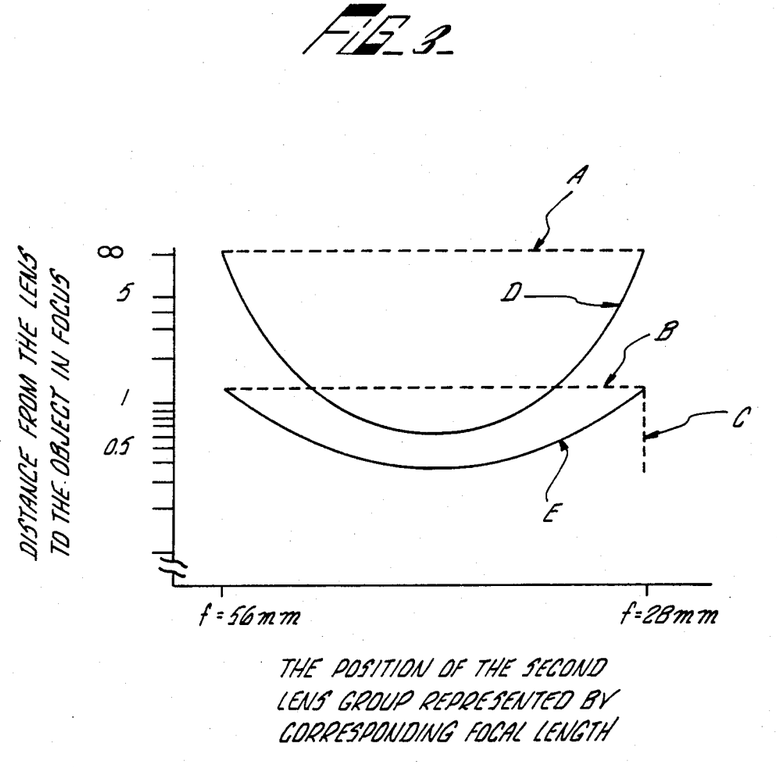
FIG. 3 is a diagram disclosing the distance from a lens to an object in focus as a function of the position of the second lens group.

If the second lens group 2 is shifted towards the first lens group 1 to a position wherein the inter-lens group distance therebetween would be 18.00 mm., i.e., to a point midway between the two extremes of the focal length range, then $S_1 = 446.56$ mm. and the distance from the lens assembly to an object in focus will be shifted to an extremely short distance, e.g., within a macro-photography range of less than one meter which cannot be normally focussed, as disclosed on curve D in FIG. 3. With the second lens group 2 in the close-up or (M) position, the first lens group 1 can be moved by the focus ring 4 to effectuate focusing wherein $S_1 = 237.91$ mm. and the maximum movement of the first lens group would be 2.50 mm. As a result of the present invention, it can be seen that within the range of $S_1$ from $-237.91$ mm. to $-446.56$ mm. that macro-photography can be conveniently accomplished.

As is apparent from the above example, the lens assembly of the present invention permits focusing at a distance from an infinite point to a relatively short distance at focal lengths of $f = 28$ mm. and $f = 56$ mm. by adjusting the focus ring 4 in accordance with the graduations 10. Thus, the shifting or movement of the handle 9 from one end to the other end of the slot or groove 7 permits the varifocal lens system of the present invention to be employed at two different image magnifications. As an important additional feature of the present invention, if the handle 9 is set at the midpoint of its sliding stroke, that is, at the position marked CLOSE-UP on the lens barrel 6, then the focal position of an object can be placed in focus at a much shorter distance than possible with the normal focussing. In this position, the lens assembly of the present invention can be advantageously utilized as a macro-lens for macro-photography.

As is apparent from curve D of FIG. 3, which plots the in focus distance of an object from the front lens versus the position of the second lens across the predetermined focal range, it can be seen that the designed parameters of the present invention are specifically directed to providing macro-photography throughout the intermediate movement of the second lens group. Curve D represents the optimum distance for an object in focus with the focus ring 4 adjusted to focus at infinity. Curve E represents the optimum distance for an object in focus with the focus ring 4 adjusted to focus at the shortest possible distance.

It should be realized that the graduations 10 on the focus ring 4 have been set for only use in $f = 28.00$ mm. and $f = 56.00$ mm. and do not correspond, to the focusing for macro-photography. This is readily understood by a sophisticated photographer who has used a close-up lens attachment or an extension tube attachment with a conventional lens assembly for close-up photography. For comparison purposes, the broken line B is disclosed on FIG. 3 to represent a case where a conventional zoom lens is focused at its shortest possible distance. The broken line C represents the case where a macro-photographic attachment or accessory is used on a conventional zoom lens in $f = 28.00$ mm.

As can be readily appreciated from FIG. 3, with the present invention, macro-photography can be accomplished within the range of distances enveloped by the curves D and E. While not disclosed in FIGS. 1, 2 and 4, it should be realized that in setting the position of the movable lens group 2, that an appropriate fastener or stopper means can be utilized for both aligning and holding the lens at respectively $f = 56$ mm., CLOSE-UP and $f = 28$ mm. positions.

While the embodiments disclosed utilize the front lens or first lens group 1 for focusing purposes, it should be realized that the third lens group 3 or the entire lens assembly can be shifted for focusing. Likewise the handle 9 which is shown mounted on the movable lens frame or tube 8, can be constructed in alternative arrangements and also be driven by any known drive means.

In an alternative embodiment (not shown), the varifocal lens system can be composed of a positive lens group, a negative second lens group, a positive third lens group and a negative fourth lens group in sequential order as viewed from the object side of the lens system. In this lens arrangement, the second and fourth lens groups are fixably mounted within the stationary lens barrel while the first and third lens groups are integrally slidable as a movable lens group. During the sliding movement of the two part movable lens group an image plane will be shifted succeedingly to the back of a design focal plane or a photosensitive film plane and then advanced, to a greater degree than normal in a conventional zoom lens, forward of the focal plane which is the position at both extreme ends of the focal range. The advantages of a four-component optical lens system is that it permits a greater correction of the image aberrations of the system over its entire operating range since it has more Gaussian design parameters to vary.

In the case of a four-component lens system, zero image plane deviation can be achieved for three different focal lengths long the sliding stroke of the lens assembly as well as provide a point in front of the film plane to which an image plane is shifted and thereby can be utilized for macro-photography. Briefly, by moving an appropriate handle interconnected to the first and third lens groups to move them in unison there is provided a varifocal lens system that can be employed for both macro-photography as well as employed for normal photographing at three different focal lengths.

Figure 4:
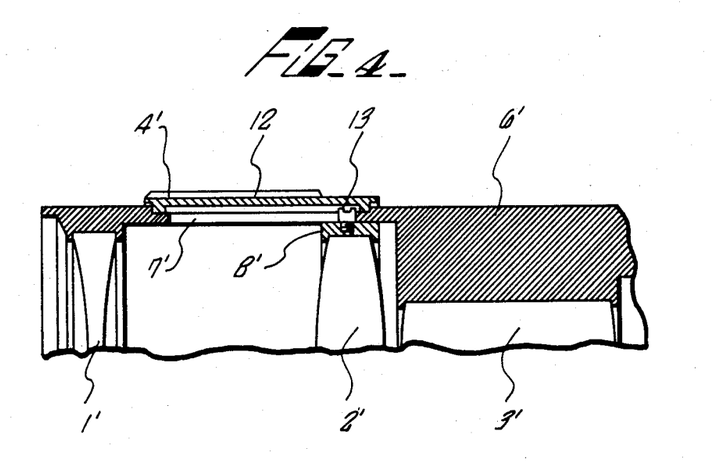
FIG. 4 is a cross sectional view of a symmetrical lens system representing another embodiment of the present invention.

Referring to FIG. 4, another embodiment of the present invention is disclosed. In this embodiment, the first and third lens groups 1' and 3' are carried by a stationary lens barrel 6'. A spiral alignment groove 12 is provided on the inner wall of a focus ring 4'. A guide pin 13 is mounted on the movable lens barrel of frame 8' and fitted into the alignment groove 12. The guide pin 13 is adapted to be guided along a slot 7' that is cut parallel to the optical axis of the lens system. In this construction, the second lens group 2' is allowed to slide when the focus ring 4' is turned. The graduations showing the distance from the lens to the object, which are provided on the focus ring 4' are marked taking into account the relationship between the point to which the second lens group is moved and a distance from the lens to the object to be focused.

Referring to FIG. 3, curve D would be a representation of the graduation markings on the focal ring 4'. In this embodiment macro-photography can be effectuated but not at a distance as close as that disclosed in the embodiment of FIG. 1 because the relationship between the distance from the lens to the object and the focal length is determined in accordance only with curve D of FIG. 3.

In the embodiment of FIG. 4, the adjustments permitted to repeat the parameters of curve E are not available. However, in this embodiment there is provided a relatively simple varifocal lens system that is still capable of providing two different focal lengths, i.e., two kinds of image magnifictions at any distance and also macro-photography that forms a combined improvement over the conventional zoom lens with their cumbersome attachments.

Figure 5:
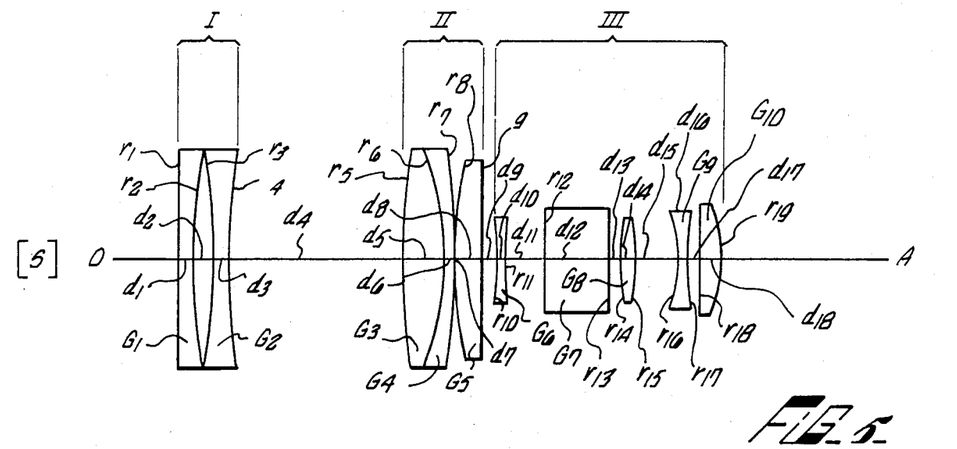
FIG. 5 is a schematic view of a further embodiment of the present invention with the lens at the shortest focal length.
Figure 6:
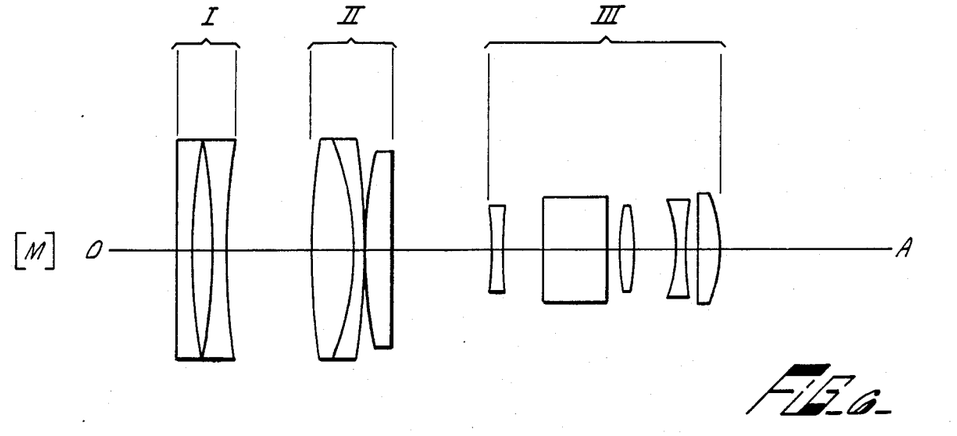
FIG. 6 is the lens system of FIG. 5 at a close-up position.
Figure 7:
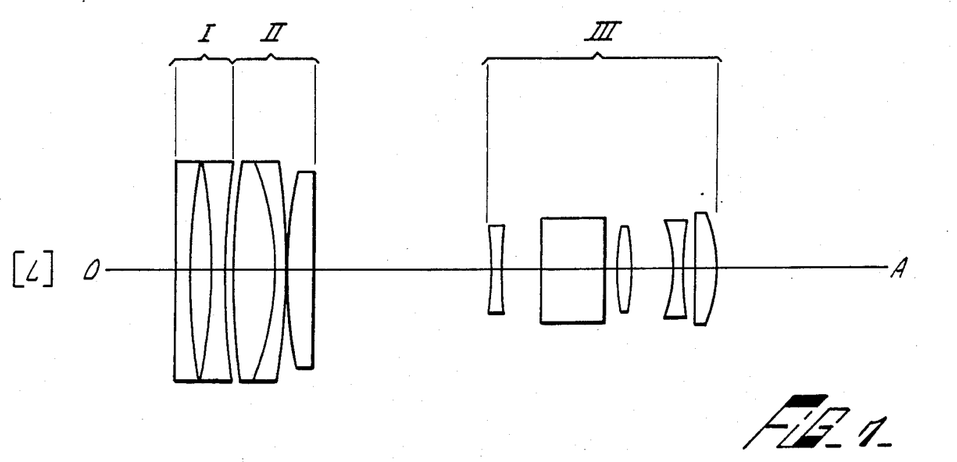
FIG. 7 is the lens system of FIG. 5 at the longest focal length of the lens system.

FIGS. 5, 6 and 7 disclose still another embodiment of the present invention. In this embodiment, a varifocal lens system, capable of macro-photography is provided having a focal length range of approximately 28 mm. to 55 mm. with a field of angle of approximately 24° to 45°. The specific data of the lens system is given in the following table.

TABLE 1

|  |  |  | Radius of Curvature |  | Distance | Refractive Index | Abbe's Number |
|---|---|---|---|---|---|---|---|
| I | $G_1$ | $r_1$ | −237.534 | $d_1$ | 1.200 | 1.48749 | 70.15 |
|  |  | $r_2$ | 25.535 | $d_2$ | 1.436 |  |  |
|  | $G_2$ | $r_3$ | −135.962 | $d_3$ | 1.200 | 1.48749 | 70.15 |
|  |  | $r_4$ | 43.525 | $d_4$ | 20.787–0.787 (variable) |  |  |
| II | $G_3$ | $r_5$ | 46.381 | $d_5$ | 5.299 | 1.62041 | 60.29 |
|  | $G_4$ | $r_6$ | −34.029 | $d_6$ | 1.000 | 1.80518 | 25.43 |
|  |  | $r_7$ | −68.817 | $d_7$ | 0.101 |  |  |
|  | $G_5$ | $r_8$ | 45.126 | $d_8$ | 2.999 | 1.67790 | 55.38 |
|  |  | $r_9$ | −341.339 | $d_9$ | 1.641–21.641 (variable) |  |  |
| III | $G_6$ | $r_{10}$ | −32.995 | $d_{10}$ | 1.000 | 1.48749 | 70.15 |
|  |  | $r_{11}$ | 59.116 | $d_{11}$ | 3.921 | 2.446 1.475 |  |
|  | $G_7$ | $r_{12}$ | ∞ | $d_{12}$ | 7.850 | 1.51680 | 64.04 |
|  |  | $r_{13}$ | ∞ | $d_{13}$ | 0.895 |  |  |
|  | $G_8$ | $r_{14}$ | 27.698 | $d_{14}$ | 1.700 | 1.72124 | 38.04 |
|  |  | $r_{15}$ | −40.650 | $d_{15}$ | 4.700 |  |  |
|  | $G_9$ | $r_{16}$ | −16.766 | $d_{16}$ | 1.000 | 1.74000 | 28.28 |
|  |  | $r_{17}$ | 30.682 | $d_{17}$ | 1.800 |  |  |
|  | $G_{10}$ | $r_{18}$ |  | $d_{18}$ | 2.400 | 1.69350 | 53.39 |
|  |  | $r_{19}$ | −15.710 | $d_{total}$ | 60.929 |  |  |

As is apparent from FIGS. 5 through 7 and Table 1, the individual lens elements $G_1$ and $G_2$ constitute a first lens group I and the lens elements $G_3$, $G_4$ and $G_5$ constitute a second, intrically movable, lens group II while the lens elements $G_6$ through $G_{10}$ constitute a stationary third lens group III serving as a master lens assembly. The lens element, $G_7$, is simply a prism having no refractive power. The axial distances along the optical axis of the lens system is identified as, $d_i$. Since the second lens group II is movable, the axial distances, $d_4$ and $d_9$, between the respective first and third lens groups are variable.

Referring to FIG. 5, the second lens group II is positioned at a point within the lens system at which the overall focal length of the lens assembly would be at its smallest length (S). FIG. 7 represents the case in which the second lens group is positioned at a point wherein the overall focal length of the lens assembly would be its longest, (L). Finally, FIG. 6 represents the position of the second lens group at which macro-photography (M) can be advantageously effectuated. Referring to Table 1 it can be seen that in the case of (S), $d_4$ = 20.787 mm. $d_9$ = 1.641 mm. in the case of (L), $d_4$ = 0.787 mm. and $d_9$ = 21.264 mm. and finally in the case of (M), $d_4$ = 10.787 mm. and $d_9$ = 11.641 mm.

Figure 8:
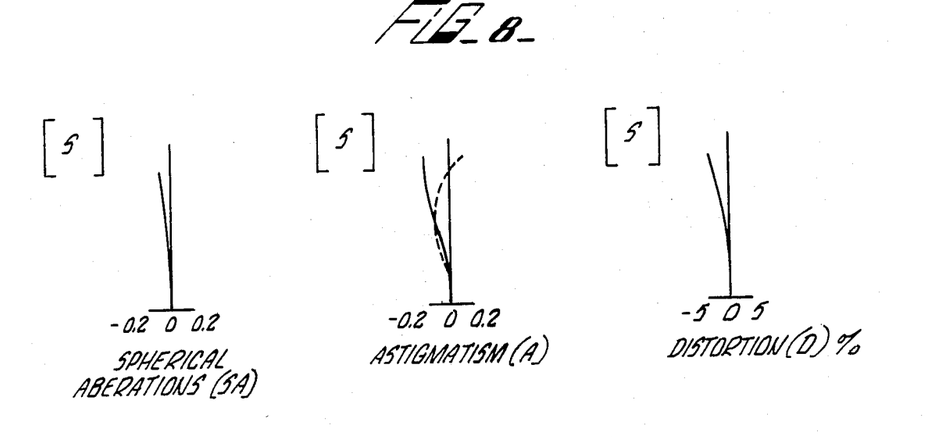
FIG. 8 is a plot of the spherical aberrations, astigmatism and distortion of the lens system of FIG. 5.
Figure 9:
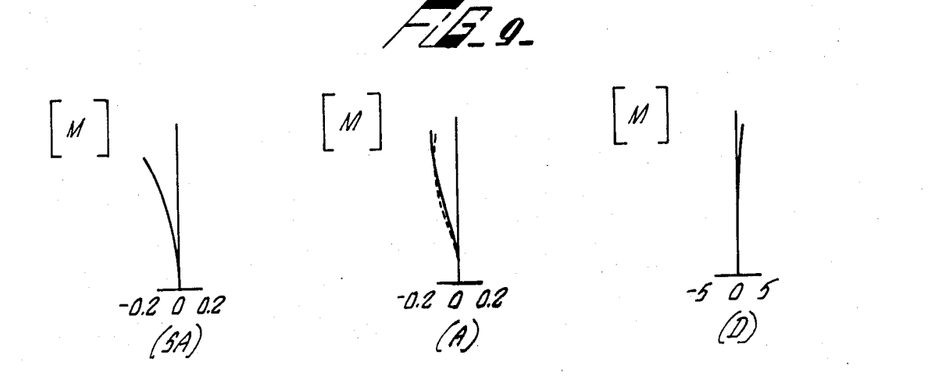
FIG. 9 is a plot of the spherical aberrations, astigmatism and distortions of the lens system in the position of FIG. 6.
Figure 10:
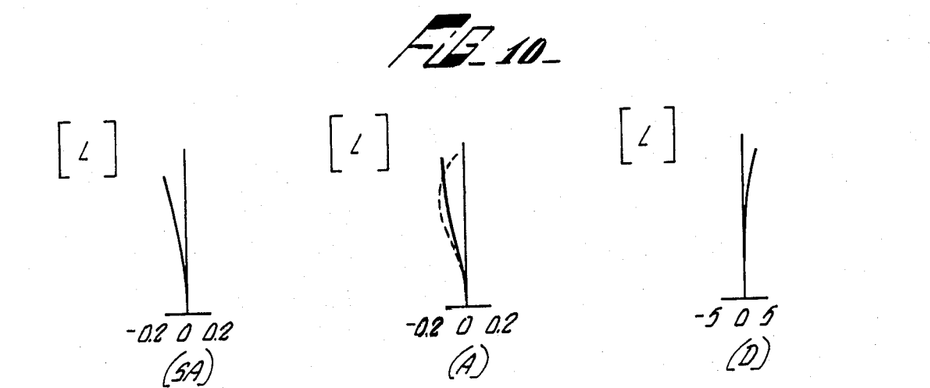
FIG. 10 is a plot of the spherical aberrations, astigmatism and distortions for the lens system in the position of FIG. 7.

Referring to FIGS. 8, 9 and 10, graphical representations are provided of the various aberrations produced by the embodiment of FIGS. 5 through 7. FIG. 8 represents the respective spherical aberrations, astigmatism, and distortion for the position of the lenses in FIG. 5. The aberrations of FIG. 6 are plotted in FIG. 9 while the aberrations of FIG. 7 are plotted in FIG. 10.

Figure 11:
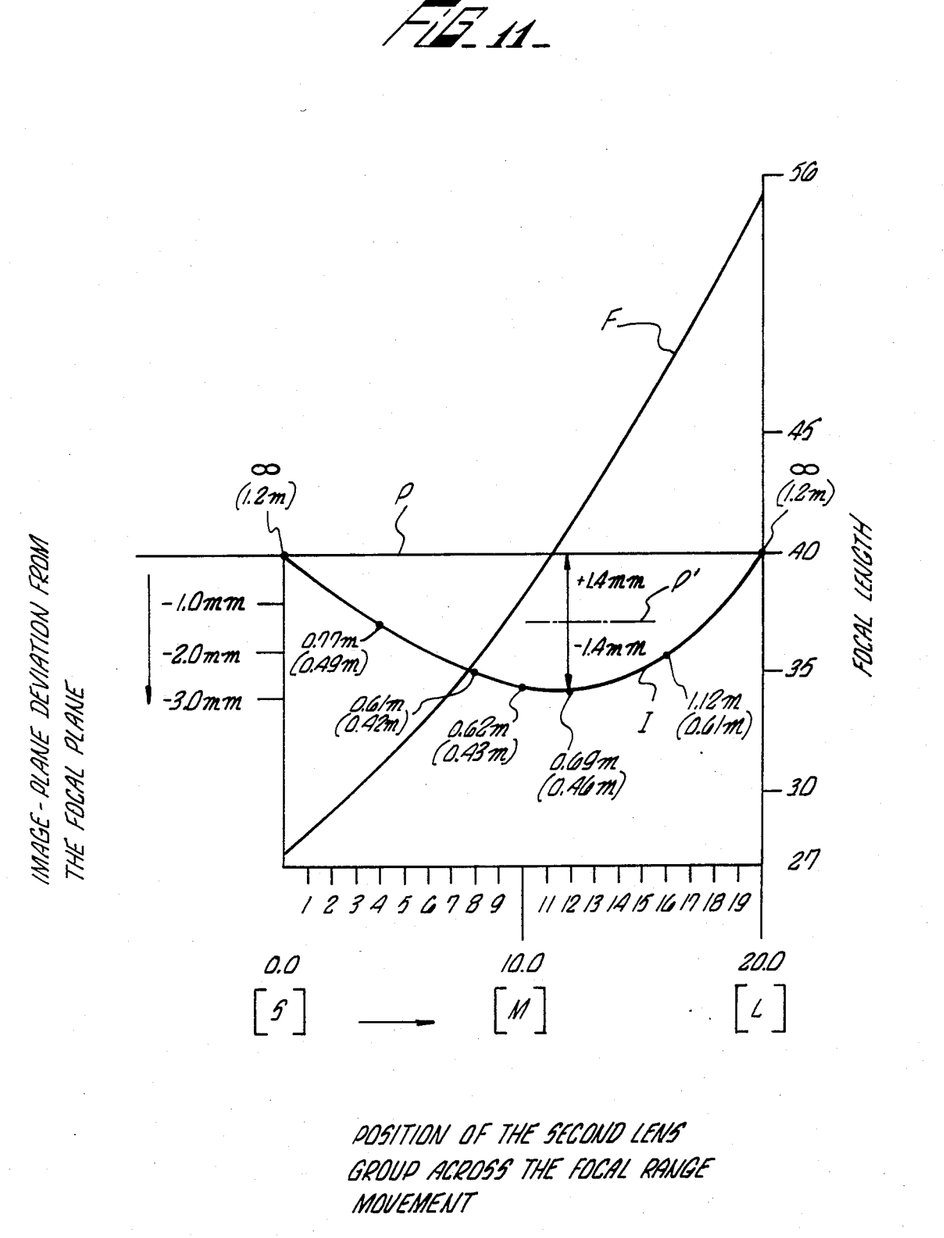
FIG. 11 is a combined graph representing variations in both focal length and image plane deviation relative to the position of the second lens group of FIGS. 5 through 7.

Referring to FIG. 11, a combined graph is presented wherein the X coordinate is a common denominator and provides the position of the second lens group wherein the shortest focal length is designated the initial or zero point. The right hand, Y, coordinate provides ascending values of the focal length of the lens system while the left hand Y coordinate provides an indication of the image plane deviation from the design focal plane or film plane. Curve F represents the variation of the overall focal length of the lens system versus the position of the second lens group. Curve I represents the image plane deviation versus the position of the second lens group.

The straight line P simply represents the position of the focal plane from which the image plane deviation is measured and the respective dimensions plotted on curve I represent various distances from the front lens to an object in focus for two different conditions.

As can be seen from FIG. 11, the initial position of the image plane is set to coincide with the focal plane of the lens system at both extremities of the focal range, that is, (S), and (L). As can further be seen from the curve I and the line P representing the focal plane, the image plane of the present invention is deviated or shifted from an initial position conjugate with the focal plane in a negative direction, that is towards the object side in roughly a parabolic function between position (S) and position (L). This extreme image plane shift would be highly undesirable in a conventional zoom lens.

As can be seen in FIG. 11, and in accordance with the present invention, the actual image plane deviation during macro-photography is larger than 2.0 mm. This can be equivalently expressed as a ratio of the focal length at the maximum image plane deviation, that is a maximum image plane deviation of greater than 2.0 mm divided by the focal length 40 mm equals greater than 0.05. An equivalent focal length, $f$, known by optical designers as based on a proportional dimensionless design system with $f$ = 1.0000, see U.S. Pat. No. 3,874,771, can further modify the maximum ratio to define the maximum macrophotography image plane deviation as being greater than $0.05 f$.

As mentioned before, the marked figures on the curve I represent the distances from the front lens and the object in focus, correspondingly determined to the extent of the image deviation. Those figures without the parentheses represent the distance from the lens to an object in focus with the conventional focus means set at a graduation showing infinity. Figures in parentheses show the objective distance in focus with the conventional focus means set at a graduation showing 1.2m.

Figure 12:
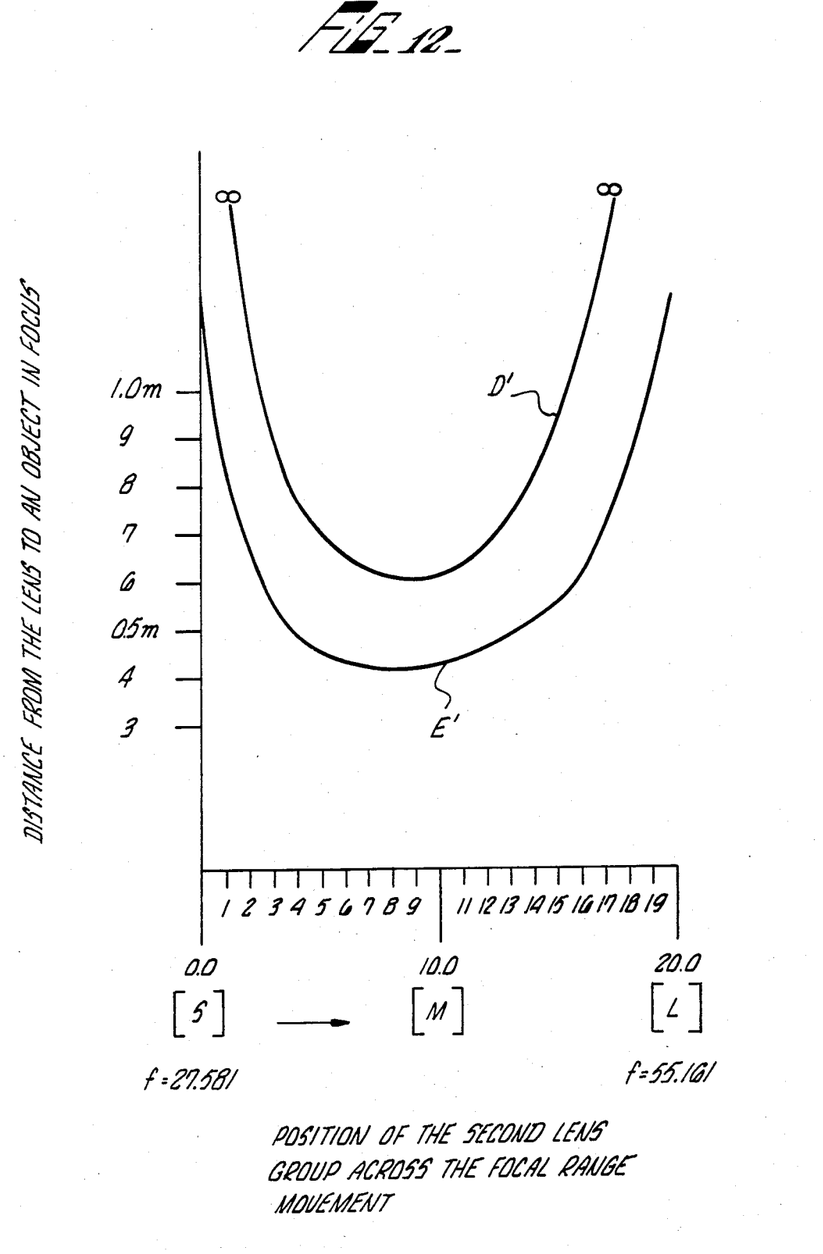
FIG. 12 is a graph which represents the relationship between the position of the second lens group and the distance from the lens to the object in focus.

FIG. 12 plots the distance figures of curve I in FIG. 11 wherein curve D′ represents the figures without the parentheses and curve E′ represents those figures in parentheses. As can be appreciated the present invention permits photography to be effectuated within an area enclosed by curves D′ and E′. As can be appreciated by those skilled in the art, the plot of FIG. 12 is substantially the same as the curves D and E of the first embodiment expressed in FIG. 3.

Referring to the embodiments of FIGS. 5 through 12, the position of the second lens group (M), is disclosed as set exactly at the mid-point distance between the second lens group positions at the extremes of the focal range (S) and (L). However as can be readily seen from curves D′ and E′ of FIG. 12, if the second lens group is physically positioned at a point slightly closer to the short focal length (S) rather than set at the exact mid-point, macro-photography can be effectuated at a much closer length or distance. Thus, if desired, to maximize the shortest distance possible for macro-photography at (M), alternative design can be accomplished by setting the position (M) at a position somewhat closer to the short focal length (S) than that of the long focal length (L).

Referring again to FIG. 11, there is superimposed upon the graph a dotted line P′ which represents a design position of a focal plane for minimizing the image plane deviation of a commonly used zoom lens assembly, simply for the purposes of illustration. If P′ represents the design focal plane of the commercial zoom lens, which has been established by design parameters to insure a compromise of in focus positions across the entire focal range, then from FIG. 11 the image plane deviation will be 1.4 millimeter maximum on the positive side of the abscissa of the focal plane P′ and a 1.4 millimeter maximum on the negative side thereof. If these maximum image plane deviations still are within a range of the depth of focus, the zoom lens can be used as a zoom lens free from loss of focus over the entire range of variable focal lengths for which it is designed. However, ± 1.4 mm. image plane deviations are considerably larger and would not be within a range of the depth of focus.

The present invention however, purposely introduces an exaggerated image plane deviation to enhance the macro-photographic characteristics of the inventive varifocal lens assembly while still providing at least a pair of image magnifications or focal lengths to effectuate long range distortion free photography.

Thus, as can be appreciated by an optical designer skilled in this field, the design parameters of the present invention provide an increase in an image plane deviation across a select focal length range which would be unsuited to the normal commercial zoom lens but in the context of the present invention the increase in the image plane deviation permits a close-up or relatively versatile lens with a simple manufacturing format.

Various modifications of the present invention can be accomplished herein by a skilled optical designer and accordingly the present invention should be measured solely from the following claims, in which we claim:

What is claimed is:

1. A macrophotography varifocal lens assembly capable of being focussed for attachment to a camera body and the like to provide an image of an object at a predetermined design focal plane comprising:
   a first lens group;
   a second lens group; and
   mounting means for mounting for first and second lens groups, one of the lens group being movably mounted relative to the other to provide a continuously increasing focal length for the lens assembly as it moves across a predetermined range of movement between at least two focal lengths of substantial zero image plane deviation, the refracted image of the object lying in an image plane behind the second lens group relative to the object, the image plane being continuously shifted during movement of the lens group from an initial predetermined position at one end of the range of movement towards the object and then away from the object to return to the initial predetermined position at the other end of the range of movement, the relative movement of the image plane from the initial position towards the object being greater than 0.05 $f$ at its maximum, wherein $f$ is the focal length of the lens assembly when the relative movement of the image plane is at approximately its maximum.

2. The invention of claim 1 wherein the second lens group is movably mounted to provide at least a pair of different focal lengths to the lens assembly having an intermediate macro-photography range of less than one meter between the two focal length positions, the first lens group having negative refractive power and the second lens group having positive refractive power and being located on the image side of the first lens group.

3. The invention of claim 2 wherein the mounting means positions the second lens to provide a first focal length with substantially zero image plane deviation at one end of the range of movement and at least a second focal length with substantially zero image plane deviation at the other end of movement.

4. The invention of claim 3 wherein the mounting means positions the second lens at approximately a mid-point of the range of movement to provide macro-photography of an object less than one meter from the lens system with an image plane deviation of greater than 2.0 mm.

5. The invention of claim 1 further including means for adjusting the focus of the varifocal lens assembly by movement of the first lens group along the optical axis.

6. The invention of claim 1 further including operating means for adjusting the focus of the varifocal lens assembly by movement of the second lens group for shifting the image plane of the varifocal lens assembly.

7. The invention of claim 6 wherein the operating means further comprises means for indicating the distance that is in focus corresponding to the shift of the image plane.

8. The invention of claim 7 wherein the operating means includes a focus ring rotable around the varifocal lens assembly.

9. A varifocal lens assembly capable of macrophotograph comprising:
a first lens group of negative refractive power;
a second lens group of positive refractive power located behind the first lens group and movable along an optical axis for continuously increasing the overall focal length of the varifocal lens assembly in the course of its movement from a first predetermined position to a second predetermined position, the image plane of the varifocal lens assembly continuously shifting during the movement of the second lens group from an initial position toward the object side away from that position and in turn back to the initial position; and
means for setting the back focal length of the varifocal lens assembly so that the initial position of the image plane is coincident with the position of the focal plane when the image plane is that of an object at infinite and the lens assembly is focussed to that object, the amount of the shift of the image plane from the initial position being greater than 0.05 $f$ at its maximum, wherein $f$ is the focal length of the lens assembly with the amount of the shift of the image plane at its maximum.

10. In a varifocal lens assembly with focussing means having at least two different design focal lengths providing approximately zero image plane deviation from a predetermined design focal plane for at least one position of the focussing means, the improvement of providing a macrophotography range between the two design focal lengths comprising:
at least a first lens group;
at least a second lens group; and
mounting means for mounting the first and second lens groups, one of the lens groups being movably mounted relative to the other to provide a predetermined range of movement between at least a first and second focal length position of the lens assembly, the refracted image of the object being in an image plane capable of being coincidental with the design focal plane at both the first and second focal length positions for at least one setting of the focussing means, the image plane being shifted by the movement of the lens group to deviate away from the design focal plane, for the same setting of the focussing means, the amount of deviation of the image plane is greater than $0.05f$ at its maximum, wherein $f$ is the focal length of the lens assembly with the image plane deviation at its maximum.

11. The invention of claim 10 wherein the first lens group has a negative refractive power and the second lens group has a positive refractive power., the second lens group being located at the image side of the first group.

12. The invention of claim 11 further including a third lens group of positive refractive power mounted on the image side of the second lens group.

13. The invention of claim 11 wherein the second lens group is movable to provide a variable focal length.

14. The invention of claim 13 further comprising means for controlling the movement of the second lens group having a first position for providing a first focal length at one end of a range of movement, a second position for providing a second focal length at the other end of the range of movement and a third position for positioning the second lens group approximately midway between both ends of movement to provide a shift of the image plane of the lens assembly towards the object side sufficient for the purpose of macro-photography.

15. The invention of claim 13 wherein the focusing means includes a focus ring for moving the first lens group.

16. The invention of claim 15 further comprising means for indicating the distance for focussing of the lens system when the second lens group is positioned at either of the first and second focal length positions.

17. The invention of claim 13 wherein the movable lens group provides optimum macro-photography at approximately the mid-point of its range of movement.

18. A macro-photography varifocal lens system comprising a design parameter of approximate values within the following specification:

|   |   |   | Radius of Curvature | | Distance | Refractive Index | Abbe's Number |
|---|---|---|---|---|---|---|---|
| I | $G_1$ | $r_1$ | −237.534 | $d_1$ | 1.200 | 1.48749 | 70.15 |
|   |   | $r_2$ | 25.535 | $d_2$ | 1.436 |   |   |
|   | $G_2$ | $r_3$ | −135.962 | $d_3$ | 1.200 | 1.48749 | 70.15 |
|   |   | $r_4$ | 43.525 | $d_4$ | 20.787−0.787 (variable) |   |   |
| II | $G_3$ | $r_5$ | 46.381 | $d_5$ | 5.299 | 1.62041 | 60.29 |
|   | $G_4$ | $r_6$ | −34.029 | $d_6$ | 1.000 | 1.80518 | 25.43 |
|   |   | $r_7$ | −68.817 | $d_7$ | 0.101 |   |   |
|   | $G_5$ | $r_8$ | 45.126 | $d_8$ | 2.999 | 1.67790 | 55.38 |
|   |   | $r_9$ | −341.339 | $d_9$ | 1.641−21.641 (variable) |   |   |
| III | $G_6$ | $r_{10}$ | −32.995 | $d_{10}$ | 1.000 | 1.48749 | 70.15 |
|   |   | $r_{11}$ | 59.116 | $d_{11}$ | 3.921 | 2.446 1.475 |   |
|   | $G_7$ | $r_{12}$ | ∞ | $d_{12}$ | 7.850 | 1.51680 | 64.04 |
|   |   | $r_{13}$ | ∞ | $d_{13}$ | 0.895 |   |   |
|   | $G_8$ | $r_{14}$ | 27.698 | $d_{14}$ | 1.700 | 1.72124 | 38.04 |
|   |   | $r_{15}$ | −40.650 | $d_{15}$ | 4.700 |   |   |
|   | $G_9$ | $r_{16}$ | −16.766 | $d_{16}$ | 1.000 | 1.74000 | 28.28 |
|   |   | $r_{17}$ | 30.682 | $d_{17}$ | 1.800 |   |   |
|   | $G_{10}$ | $r_{18}$ |   | $d_{18}$ | 2.400 | 1.69350 | 53.39 |
|   |   | $r_{19}$ | −15.710 |   |   |   |   |
|   |   |   |   | $d_{total}$ | 60.929 |   |   | the above lens system providing both macro-photography and at least two different focal lengths.

* * * * *

UNITED STATES PATENT AND TRADEMARK OFFICE
CERTIFICATE OF CORRECTION

PATENT NO. : 3,994,572
DATED : November 30, 1976
INVENTOR(S) : Kyozo Uesugi et al.

It is certified that error appears in the above-identified patent and that said Letters Patent are hereby corrected as shown below:

Column 10, line 3 - delete "magnifictions" and insert --magnifications--.

Column 10, line 13 - after "table." insert

--$f = 55.298 \sim 27.581$  $Fno = 4.63$  angle of field $2\omega = 24°32' \sim 45°06'$ Signed and Sealed this Twelfth Day of April 1977

[SEAL]

Attest:

RUTH C. MASON
*Attesting Officer*

C. MARSHALL DANN
*Commissioner of Patents and Trademarks*